(12) United States Patent
Grzybowski et al.

(10) Patent No.: US 7,949,211 B1
(45) Date of Patent: May 24, 2011

(54) MODULAR ACTIVE BOARD SUBASSEMBLIES AND PRINTED WIRING BOARDS COMPRISING THE SAME

(75) Inventors: Richard Robert Grzybowski, Corning, NY (US); Brewster Roe Hemenway, Jr., Painted Post, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/714,021

(22) Filed: Feb. 26, 2010

(51) Int. Cl.
*G02B 6/12* (2006.01)
(52) U.S. Cl. .......................................... 385/14
(58) Field of Classification Search ............ 385/14
See application file for complete search history.

(56) References Cited

U.S. PATENT DOCUMENTS

| | | | |
|---|---|---|---|
| 4,732,446 A | 3/1988 | Gipson et al. | 350/96.15 |
| 6,243,509 B1 | 6/2001 | Chen | 385/14 |
| 7,187,828 B2 * | 3/2007 | Ohtsu et al. | 385/52 |
| 7,371,014 B2 | 5/2008 | Willis et al. | 385/89 |
| 2002/0196997 A1 | 12/2002 | Chakravorty et al. | 385/14 |
| 2003/0006068 A1 | 1/2003 | Tourne | 174/261 |
| 2003/0007745 A1 | 1/2003 | Martwick | 385/88 |
| 2003/0015720 A1 | 1/2003 | Lian et al. | 257/98 |
| 2003/0048998 A1 | 3/2003 | Li | 385/88 |
| 2003/0185484 A1 | 10/2003 | Chakravorty et al. | 385/14 |
| 2004/0037512 A1 | 2/2004 | Cho et al. | 385/88 |
| 2004/0109627 A1 | 6/2004 | Kim et al. | 385/14 |
| 2004/0196642 A1 | 10/2004 | Aronson et al. | 361/818 |
| 2004/0218848 A1 | 11/2004 | Shen et al. | 385/14 |
| 2005/0046011 A1 | 3/2005 | Chen et al. | 257/705 |
| 2005/0089264 A1 | 4/2005 | Johnson et al. | 385/15 |
| 2005/0094922 A1 | 5/2005 | Ha et al. | 385/14 |
| 2005/0100264 A1 | 5/2005 | Kim et al. | 385/14 |
| 2005/0163415 A1 | 7/2005 | Moynihan et al. | 385/14 |
| 2005/0163431 A1 | 7/2005 | Moynihan et al. | 385/60 |
| 2005/0169639 A1 | 8/2005 | Shen | 398/164 |
| 2005/0220437 A1 | 10/2005 | Kim et al. | 385/137 |
| 2006/0045418 A1 | 3/2006 | Cho et al. | 385/31 |
| 2006/0067064 A1 | 3/2006 | Crews et al. | 361/761 |
| 2006/0093259 A1 | 5/2006 | Oggioni et al. | 385/31 |
| 2006/0098926 A1 | 5/2006 | Shelnut et al. | 385/129 |
| 2006/0098933 A1 | 5/2006 | Shelnut et al. | 385/145 |
| 2006/0104562 A1 | 5/2006 | Rosch et al. | 385/14 |
| 2006/0120660 A1 | 6/2006 | Rolston et al. | 385/15 |
| 2006/0133755 A1 | 6/2006 | Shelnut et al. | 385/129 |
| 2006/0193565 A1 | 8/2006 | Sasaki et al. | 385/65 |
| 2006/0222284 A1 | 10/2006 | Mohammed | 385/14 |
| 2006/0285806 A1 | 12/2006 | Ahrens | 385/92 |
| 2007/0019899 A1 * | 1/2007 | Ohtsu et al. | 385/14 |
| 2007/0147729 A1 | 6/2007 | Dellmann et al. | 385/14 |
| 2007/0183718 A1 | 8/2007 | Bae et al. | 385/47 |
| 2007/0223935 A1 | 9/2007 | Asai et al. | 398/164 |
| 2008/0036021 A1 | 2/2008 | Miyoshi et al. | 257/432 |
| 2008/0044127 A1 | 2/2008 | Leising et al. | 385/14 |

(Continued)

*Primary Examiner* — Michelle R Connelly Cushwa
(74) *Attorney, Agent, or Firm* — Svetlana Z. Short

(57) ABSTRACT

A modular active board subassembly for coupling a waveguide array to an electrical component on a printed wiring board may include a substrate board with a sidewall extending around at least a portion of an attachment surface of the substrate board and forming a component cavity on the attachment surface. A transceiver may be disposed in the component cavity proximate an inboard edge of the substrate board. The transceiver may be electrically coupled to conductors on the attachment surface and electrically coupled to electrical contacts on an upper surface of the sidewall. A waveguide may be positioned in the component cavity and extend from the outboard edge of the substrate to the transceiver. The waveguide may be coupled to the transceiver.

19 Claims, 4 Drawing Sheets

U.S. PATENT DOCUMENTS

| | | | |
|---|---|---|---|
| 2008/0044129 A1 | 2/2008 | Cho et al. | 385/14 |
| 2008/0044130 A1 | 2/2008 | Pitwon | 385/14 |
| 2008/0044133 A1 | 2/2008 | Degroot, Jr. et al. | 385/31 |
| 2008/0075408 A1 | 3/2008 | Cho et al. | 385/89 |
| 2008/0118200 A1 | 5/2008 | Kim et al. | 385/14 |
| 2008/0187267 A1 | 8/2008 | Anzures et al. | 385/14 |
| 2009/0010604 A1 | 1/2009 | Shibata et al. | 385/123 |
| 2009/0041409 A1 | 2/2009 | Hopkins | 385/14 |
| 2010/0021107 A1* | 1/2010 | Naruse et al. | 385/14 |
| 2010/0215317 A1* | 8/2010 | Rolston et al. | 385/53 |

* cited by examiner

MODULAR ACTIVE BOARD SUBASSEMBLIES AND PRINTED WIRING BOARDS COMPRISING THE SAME

BACKGROUND

1. Field

The present specification generally relates to active wiring board interconnects and, more specifically, to modular active board subassemblies and printed wiring board assemblies comprising the same.

2. Technical Background

High performance computers require high speed data interconnections between hundreds or even thousands of discrete processing units. In a typical computer system these processors may be deployed on multiple printed wiring boards installed in several different racks. As data rate requirements increase, the growing cost and physical size of electrical interconnection cables has driven system architects to switch to optical links. The trend toward optical interconnects, which started in long- and medium-length rack-to-rack links, is continuing as the demand for high speed data interconnections increases. However, the use of traditional "cables" to bring optical signals directly to processing units is cumbersome and requires the use of connectors on the board surface proximate the processing units which take up valuable space on the mounting surface of the printed wiring board. Further, placement of the optical cables over the surface of the board can interfere with air flow over the board and, as a result, adversely impact the cooling of electronic circuits located on the board. Accordingly, a need exists for alternative optical interconnects.

SUMMARY

A modular active board subassembly for coupling a waveguide array to an electrical component on a printed wiring board may include a substrate board with a sidewall extending around at least a portion of an attachment surface of the substrate board and forming a component cavity on the attachment surface. A transceiver may be disposed in the component cavity proximate an inboard edge of the substrate board. The transceiver may be electrically coupled to conductors on the attachment surface and electrically coupled to electrical contacts on an upper surface of the sidewall. A waveguide may be positioned in the component cavity and extend from the outboard edge of the substrate to the transceiver. The waveguide may be coupled to the transceiver.

In another embodiment, a printed wiring board assembly includes a primary substrate and a modular active board subassembly. The modular active board subassembly may include a substrate board having an attachment surface extending between an inboard edge and an outboard edge. A transceiver may be positioned proximate an inboard edge of the substrate board. At least one waveguide may be positioned on the attachment surface. The waveguide may extend from the outboard edge of the substrate to the transceiver such that the at least one waveguide is coupled to the transceiver. The active board assembly may also include an waveguide connector aligned with the outboard edge. The primary substrate may include a component mounting surface having a plurality of electrical contacts spaced apart from a peripheral edge. A board receiving slot may extend from a peripheral edge of the primary substrate in an inboard direction. The modular active board subassembly may be positioned in the board receiving slot such that the at least one waveguide and the transceiver are recessed from the component mounting surface and an outboard edge of the modular board assembly is aligned with the peripheral edge of the primary substrate.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 4:
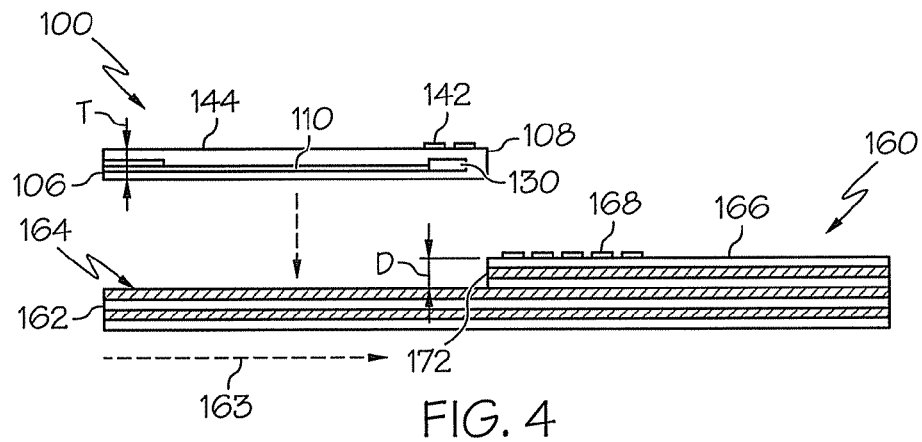
FIG. 4 depicts a cross-sectional view of the modular active board subassembly of FIG. 3 being installed on a primary substrate to form a printed wiring board assembly according to one or more embodiments shown and described herein.

Reference will now be made in detail to various embodiments of printed wiring board assemblies and modular active board subassemblies for incorporation in printed wiring board assemblies, examples of which are illustrated in the accompanying drawings. Whenever possible, the same reference numerals will be used throughout the drawings to refer to the same or like parts. One embodiment of a printed wiring board assembly is schematically depicted in FIG. 4. The printed wiring board assembly includes a primary substrate and a modular active board subassembly. The printed wiring board is formed with a board receiving slot which extends from a peripheral edge of the primary substrate inwards. The modular active board subassembly includes at least one waveguide extending between an outboard edge and a transceiver positioned proximate on inboard edge. The modular active board subassembly may be positioned in the board receiving slot of the primary substrate such that the waveguide and transceiver are recessed from the component mounting surface of the primary substrate. Printed wiring board assemblies and modular active board subassemblies for incorporation in printed wiring board assemblies will be described in more detail herein.

Figure 1:
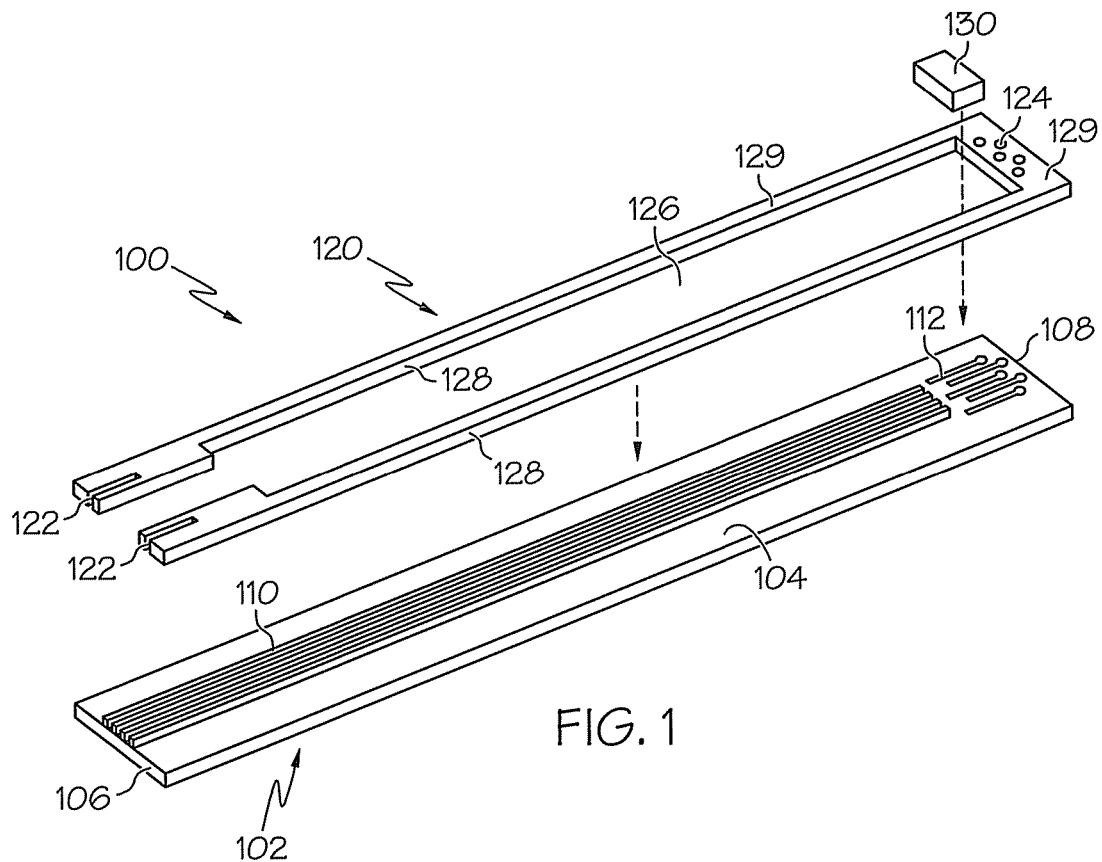
FIG. 1 depicts a partially exploded view of a modular active board subassembly according to one or more embodiments shown and described herein.
Figure 2:
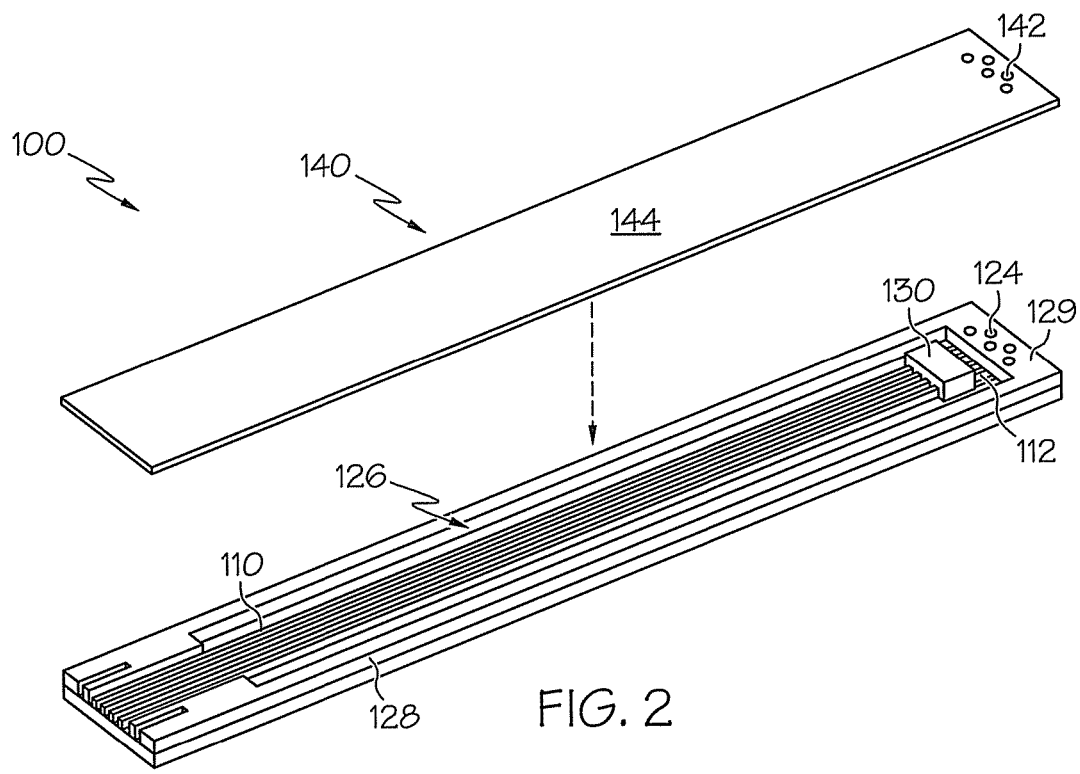
FIG. 2 depicts a partially exploded view of a modular active board subassembly according to one or more embodiments shown and described herein.
Figure 3:
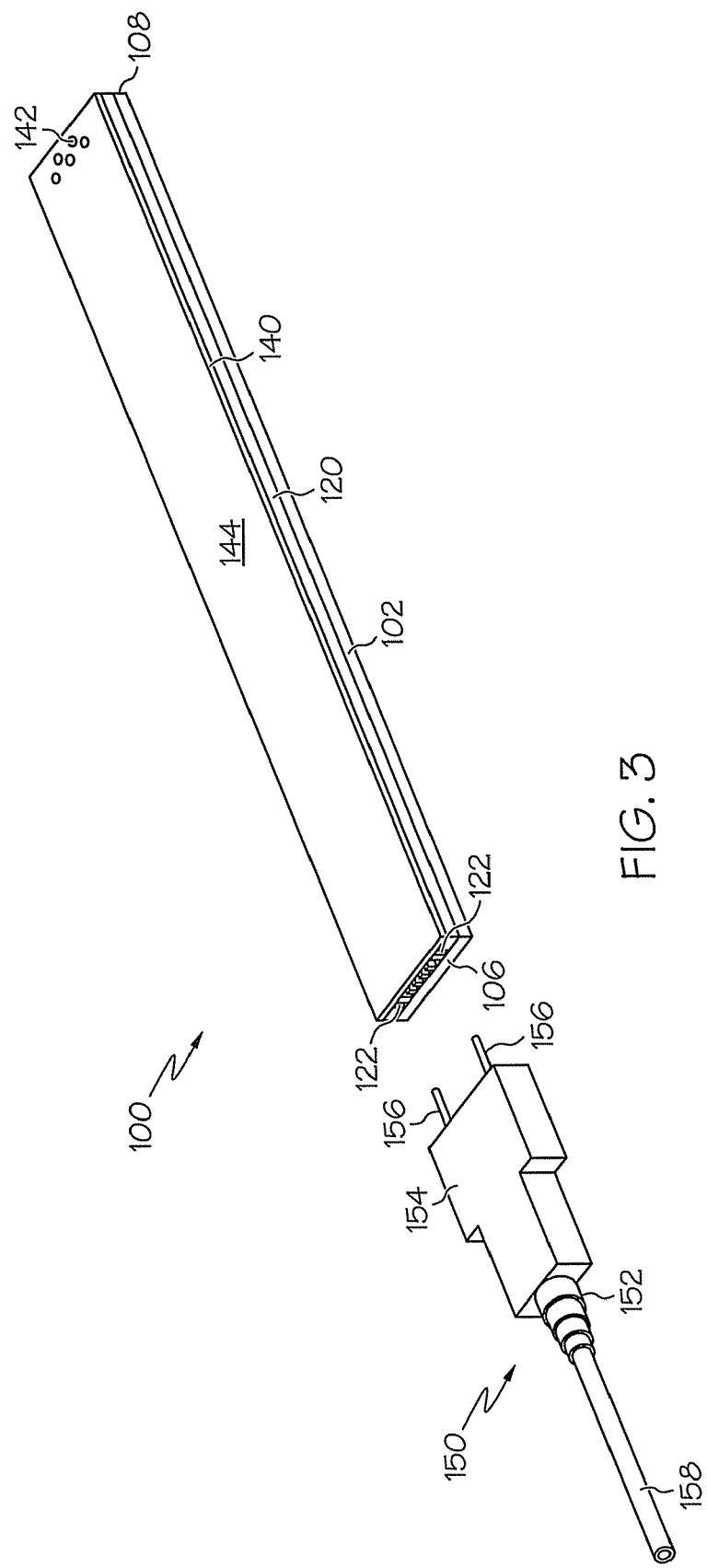
FIG. 3 depicts a perspective view of a modular active board subassembly according to one or more embodiments shown and described herein in conjunction with an optical cable.

Referring now to FIGS. 1-3, a modular active board subassembly 100 which may be incorporated into a printed wiring board assembly is schematically depicted. In one embodiment, the modular active board subassembly 100 generally comprises a substrate board 102 on which a component mounting cavity 126 is formed. In the embodiments shown and described herein, the substrate board 102 is formed from commercially available printed wiring board material which may include a lamination of conductive layers alternately arranged with dielectric insulating layers. For example, in one embodiment the printed wiring board may be formed from alternating layers of copper and FR-4 glass fiber/epoxy resin dielectric material. However, it should be understood that other suitable printed wiring board materials may be used to form the substrate board including, without limitation, rigid wiring board materials and flexible wiring board materials.

The substrate board 102 includes an attachment surface 104 to which various electrical, opto-electrical and/or optical devices may be mounted. The attachment surface 104 extends between an outboard edge 106 and an inboard edge 108. The component cavity 126 is formed on the attachment surface 104 by one or more sidewalls 128 extending around at least a portion of the perimeter of the attachment surface 104. For example, in one embodiment (not shown) the sidewalls 128 may extend around the entire perimeter of the attachment surface 104. In another embodiment, the sidewalls extend around a portion of the perimeter, as depicted in FIG. 2. In yet another embodiment (not shown) the sidewalls may be formed on the attachment surface 104 at locations where the opto-electronic components and/or electronic components are located thereby forming component cavities around the opto-electronic and/or electronic components.

In the embodiments shown and described herein the component cavity 126 is formed on the attachment surface 104 by positioning a sidewall board 120 on the attachment surface 104. The sidewall board 120 is a printed wiring board which has been patterned into a "U" shape. The sidewall board 120 is positioned on the attachment surface 104 of the substrate board 102 such that the component cavity 126 is open at the outboard edge 106 of the substrate board 102. The sidewall board 120 may be affixed to the substrate board 102 using epoxies or other similar adhesives and/or bonding agents commonly used in the assembly of electronics.

While the component cavity 126 has been described herein as being formed by positioning a sidewall board 120 on the attachment surface 104 of the substrate board 102, it should be understood that, in other embodiments (not shown), the substrate board may be integrally formed with sidewalls 128 which define the component cavity. For example, in one embodiment (not shown) the substrate board may be formed from discrete patterned layers which, when assembled, form the substrate board including the attachment surface and the sidewalls which define the component cavity.

In one embodiment, the modular active board subassembly 100 also includes a waveguide connector aligned with the outboard edge 106 of the substrate board 102. The waveguide connector is operable to mate with a corresponding waveguide array connector 154, such as the waveguide array connector of an optical cable 150. The waveguide connector may include at least one alignment feature for aligning the waveguides of the modular active board subassembly 100 with waveguides of a waveguide array. For example, the waveguide connector may include dovetails, slots, pins, receptacles or other, similar alignment features. In the embodiment of the modular active board subassembly described herein, the waveguide connector comprises a pair of alignment pin receptacles 122 for receiving the connector pins 156 of a waveguide array connector 154. In the embodiments described herein the alignment pin receptacles 122 are located in the sidewall 128 proximate the outboard edge 106 of the substrate board 102. The alignment pin receptacles 122 are substantially parallel to the attachment surface 104 of the substrate board 102. However, it should be understood that the modular active board assembly may also be formed without a waveguide connector. For example, when the modular active board assembly is formed without a waveguide connector, waveguides located on the modular active board assembly (described in more detail herein) may be passively or actively proximity coupled to waveguides on a primary substrate or waveguides located on another component.

The active modular board subassembly 100 also includes a transceiver 130. In the embodiments described herein, the transceiver 130 is operable to convert electromagnetic energy, such as visible light, infrared radiation, microwave energy or the like, to an electronic signal and convert electronic signals to electromagnetic energy which can be guided by a waveguide. More specifically, in the embodiments described herein the transceiver 130 is an opto-electronic transceiver which is operable to receive an optical input signal and convert the optical input signal into an electrical output signal. The opto-electronic transceiver may also be operable to receive an electrical input signal and convert the electrical input signal into an optical output signal. The transceiver 130 is positioned in the component cavity 126 and mounted on the attachment surface 104 of the substrate board 102 proximate to the inboard edge 108 of the substrate board 102. In the embodiments shown and described herein, the transceiver 130 is electrically coupled to electrical conductors 112 attached to the attachment surface 104. For example, the electrical conductors 112 may include flip chip electrical pads. Alternatively, the electrical conductors may comprise wirebonds to adjacent printed wiring board conductive pads. The electrical conductors 112 are further coupled to electrical contacts 124 located on an upper surface 129 of the sidewall 128. For example, in one embodiment, the electrical conductors may be electrically coupled to electrical vias which extend through the sidewall 128 from the attachment surface 104 to the upper surface 129 of the sidewall 128.

The sidewalls 128 of the component cavity 126 extend from the attachment surface 104 to a height which is generally greater than the thickness of the transceiver 130. Accordingly, it should be understood that the transceiver is located in the space between the plane defined by the attachment surface 104 of the substrate board 102 and the plane defined by the upper surface 129 of the sidewalls 128, which planes are generally parallel with one another. In one embodiment, the top surface of the transceiver may be at the same height above the attachment surface 104 as the upper surface 129 of the sidewalls 128 of the component cavity 126.

In one embodiment (not shown) one or more transceiver support components may be positioned in the component cavity and electrically coupled to the transceiver. For example, transceiver support components such as laser drivers, amplifiers, signal conditioning units and the like may be electrically coupled to the transceiver through electrical traces formed on the attachment surface of the substrate board. The transceiver support components may also be electrically coupled to electrical contacts located on the upper surface of the sidewalls through electrical vias formed in the sidewalls.

The transceiver 130 is coupled to at least one waveguide 110. For example, in one embodiment, where the transceiver is an opto-electronic transceiver, the transceiver 130 may be optically coupled to a plurality of waveguides wherein each waveguide is operable to guide an electromagnetic input signal (i.e., light) into the transceiver 130 and/or guide an electromagnetic output signal (i.e., light) from the transceiver 130. The waveguides may comprise any suitable waveguide for guiding a specified wavelength of electromagnetic radiation. For example, the waveguides may be optical waveguides, microwave waveguides, infrared light waveguides or the like. In the embodiments described herein the waveguides are patterned optical waveguides, such as polymer waveguides positioned in the component cavity 126 and formed on the attachment surface 104 of the substrate board 102 or silica or silicon waveguides patterned on glass substrates which are attached to the attachment surface 104 of the substrate board 102. Alternatively, the waveguides 110 may comprise fiber waveguides, such as glass optical fibers or polymer optical fibers. The fiber waveguides may be bonded to the attachment surface of the printed wiring board or, in the alternative, loose optical fibers may be restrained in an internal channel formed in the substrate board 102. In another alternative embodiment, the waveguides may comprise hollow core waveguides or planar array waveguides.

As described hereinabove with respect to the transceiver 130, the waveguides 110 are located in the space between the plane defined by the attachment surface 104 of the substrate board 102 and the plane defined by the upper surface 129 of the sidewalls 128. The waveguides 110 extend from the outboard edge 106 of the substrate board 102 to the transceiver 130 where they are coupled to the transceiver 130 proximate the inboard edge 108. In the embodiments shown and described herein, the waveguides 110 are positioned at the outboard edge 106 of the substrate board 102 in the open end of the "U" shaped sidewalls 128. This positioning of the waveguides facilitates directly coupling a waveguide array to the waveguides as will be described in more detail herein. In other embodiments (not shown) the sidewalls 128 may extend around the entire perimeter of the attachment surface 104. In this embodiment the waveguides may extend through the sidewalls to the outboard edge 106.

Referring to FIG. 2, in one embodiment, the active modular board subassembly further comprises a cover board 140. The cover board 140 is positioned atop and attached to the upper surface 129 of the sidewalls 128. The cover board 140 is generally constructed from commercially available printed circuit board material as described hereinabove with respect to the substrate board 102. The top surface 144 of the cover board 140 includes electrical contacts 142 which are electrically coupled to the electrical contacts located on the upper surface 129 of the sidewalls 128 through electrical vias (not shown) in the cover board 140. The electrical contacts 142 facilitate coupling surface mount electrical components, such as integrated circuit components, located on the top surface 144 of the cover board 140 to the transceiver 130 located in the component cavity 126 between the cover board 140 and the attachment surface 104 of the substrate board 102.

In the embodiment of the modular active board subassembly 100 shown in FIG. 3 the cover board 140 is depicted with electrical contacts located proximate the inboard edge 108. However, it should be understood that the cover board 140 may comprise additional electrical contacts for electrically coupling various other integrated circuit components to the transceiver disposed beneath the cover board 140 in the component cavity and/or transceiver support components positioned in the component cavity. Further, it should also be understood that the top surface 144 of the cover board 140 may also comprise a plurality of electrical traces (not shown) which may subsequently be used to electrically couple and interconnect various integrated circuit components on the top surface 144 of the cover board 140, regardless of whether the integrated circuit components are also coupled to the various components of the modular active board subassembly 100.

Figure 5:
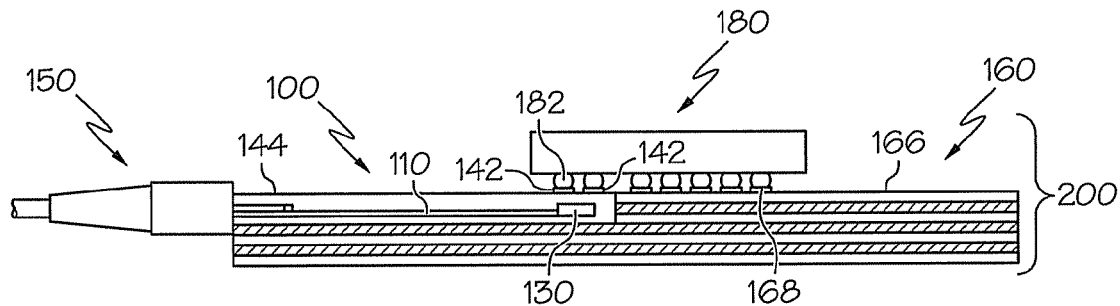
FIG. 5 depicts a cross-sectional view of the modular active board subassembly of FIG. 3 installed in a primary substrate to form a printed wiring board assembly according to one or more embodiments shown and described herein.

Referring now to FIGS. 4 and 5, the modular active board subassemblies 100 described herein may be used in conjunction with primary substrates 160 to form a printed wiring board assembly 200. More specifically, a primary substrate 160 (i.e., a "mother board" or similarly circuit board comprising various integrated circuits and subassemblies including, without limitation, processors, memory modules and the like) is formed from commercially available printed wiring board material which may include a lamination of conductive layers alternately arranged with dielectric insulating layers. For example, in one embodiment the printed wiring board may be formed from alternating layers of copper and FR-4 glass fiber/epoxy resin dielectric material. However, it should be understood that other suitable printed wiring board materials may be used to form the substrate board including, without limitation, rigid wiring board materials and flexible wiring board materials.

The primary substrate 160 includes a component mounting surface 166 which includes a plurality of electrical contacts 168 to which integrated circuits may be electrically coupled. The primary substrate 160 may also include a plurality of electrical traces (not shown) which electrically interconnect various electrical contacts 168 to facilitate electrical interconnections between various integrated circuit components. In the embodiments of the primary substrate 160 described herein, a plurality of electrical contacts 168 are offset from a peripheral edge 162 of the substrate in an inboard direction (i.e., the direction indicated by arrow 163 in FIG. 4).

The primary substrate 160 also includes at least one board receiving slot 164. The board receiving slot 164 extends from the peripheral edge 162 of the primary substrate 160 in an inboard direction and ends at an inboard stop 172. The board receiving slot 164 is complimentary in size and shape to the active modular board subassembly 100 such that, when the active modular board subassembly is positioned in the board receiving slot 164, the outboard edge 106 of the active modular board subassembly 100 is flush with the peripheral edge 162 and the inboard edge 108 is in close proximity with the inboard stop (such as when there is a slight gap between the inboard edge 108 and the inboard stop 172) or, alternatively, the inboard edge 108 is in contact with the inboard stop 172.

In one embodiment (not shown) the primary substrate includes one or more metallized planes and/or thermally conductive vias adjacent to the at least one board receiving slot 164. The metallized planes or thermally conductive vias may be operable to conduct heat away from an active board assembly positioned in the board receiving slot thereby providing a cooling mechanism for the transceiver and/or other electronic components positioned on the active board assembly.

In the embodiment of the primary substrate 160 illustrated in FIGS. 4 and 5 the component mounting surface 166 of the primary substrate 160 includes a cutout over the board receiving slot 164. In this embodiment, the depth D of the board receiving slot 164 is approximately the same as the thickness T of the modular active board subassembly 100 such that the top surface 144 of the cover board 140 is flush with the component mounting surface 166 of the primary substrate 160. In other embodiments the upper surface 129 of the sidewalls 128 (or, alternatively, the top surface 144 of the cover board 140) may be flush with, lower than, or higher than an intermediate layer 167 of the primary substrate 160, as will be described in more detail herein.

In the embodiments of the printed wiring board assemblies and modular active board subassemblies shown and described herein, the modular active board subassembly 100 is depicted as having electrical contacts proximate the inboard edge 108 while the primary substrate is depicted as having electrical contacts on the component mounting surface 166 proximate the inboard stop 172 of the board receiving slot 164. However, it should be understood that the electrical contacts need not be located proximate the inboard edge 108 and the inboard stop 172 of the board receiving slot 164. For example, in the alternative, the electrical contacts may be located on the component mounting surface 166 of the primary substrate 160 along the length of the board receiving slot 164 while the electrical contacts of the modular active board subassembly may be located along the length of the modular active board subassembly.

Referring to FIGS. 4 and 5, the modular active board subassembly 100 may be positioned in the board receiving slot 164 of the primary substrate 160 such that the outboard edge 106 of the modular active board subassembly 100 is flush with the peripheral edge of the primary substrate 160. This may be accomplished by positioning the modular active board subassembly 100 in the board receiving slot 164 such that the inboard edge 108 is in contact with the inboard stop 172. In the embodiment depicted in FIGS. 4 and 5 the top surface 144 of the modular active board subassembly 100 is disposed in the cutout over the board receiving slot such that the top surface 144 of the modular active board subassembly 100 is flush with the component mounting surface 166 of the primary substrate 160. This configuration facilitates mounting a circuit component 180, such as an integrated circuit component, on the top surface 144 of the modular active board subassembly 100 such that the circuit component 180 is at least partially disposed over the modular active board subassembly 100. Once the modular active board subassembly 100 is positioned in the board receiving slot 164 and aligned with the peripheral edge 162 of the primary substrate 160, the modular active board subassembly 100 may be attached to the primary substrate 160 with epoxy or another similar adhesive or bonding agent. The circuit component 180 may be electrically coupled to the electrical contacts 168 on the component mounting surface 166 of the primary substrate 160 and the electrical contacts 142 on the top surface of the modular active board subassembly 100 with solder balls 182. However, it should be understood that other techniques for electrically coupling the circuit component 180 to the electrical contacts may also be used.

In an alternative embodiment (not shown) the modular active board subassembly may be inverted in the board receiving slot. For example, in this embodiment, the modular active board subassembly is positioned in the board receiving slot such that the surface of the substrate board opposite the attachment surface is flush with the component mounting surface of the primary substrate and the waveguides and transceiver are positioned in the board receiving slot. In this embodiment, circuit components may be at least partially positioned on the surface of the substrate board opposite the attachment surface. In this embodiment, the substrate board may comprise electrical vias extending through the thickness of the substrate board such that the transceiver may be electrically coupled to circuit components positioned on the surface of the substrate board opposite the attachment surface.

Figure 6:
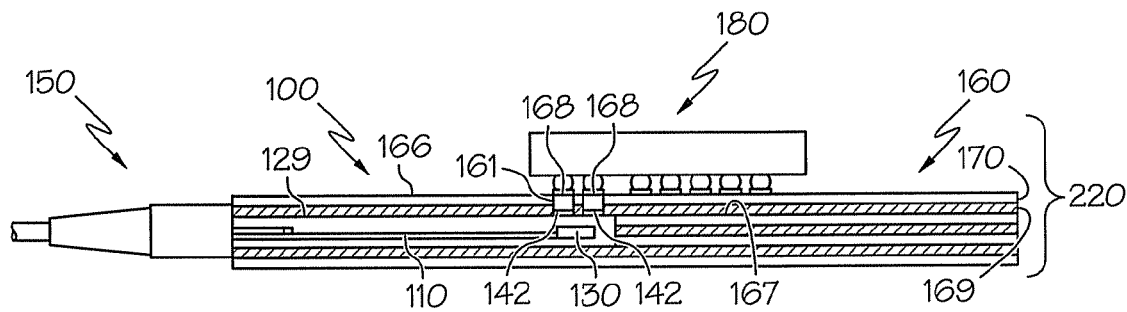
FIG. 6 depicts a cross-sectional view of the modular active board subassembly of FIG. 1 installed in a primary substrate to form a printed wiring board assembly according to one or more embodiments shown and described herein.

FIG. 6 depicts another alternative embodiment of a printed wiring board assembly 220 which includes a modular active board subassembly 100. In this embodiment, the modular active board subassembly 100 is embedded in the primary substrate 160 as the primary substrate 160 is constructed. For example, the primary substrate 160 may be constructed from alternating layers of conductive material and dielectric material as described above. As the alternating layers are built up, a plurality of the layers may be patterned to form the board receiving slot in the primary substrate 160. The modular active board subassembly 100 may be positioned in the board receiving slot as described above. Thereafter, additional alternating layers of conductive material and dielectric material may be positioned over the modular active board subassembly 100 thereby embedding the modular active board subassembly beneath the component mounting surface 166 of the primary substrate 160. The electrical contacts 124 on the upper surface of the sidewall of the modular active board subassembly 100 may be electrically coupled to the electrical contacts 168 on the component mounting surface 166 with electrical vias 161 formed in the layers of conductive material 169 and the layers of dielectric material 170. Thereafter, a circuit component 180 may be mounted on the component mounting surface 166 such that the circuit component 180 is at least partially disposed over the modular active board subassembly 100. Moreover, the circuit component 180 may be electrically coupled to the active modular board assembly with the electrical contacts 168.

Referring to FIGS. 3 and 5 by way of example, the active modular board subassembly 100 may be used to couple the circuit component 180 positioned on the component mounting surface 166 of the primary substrate 160 with an interconnect. For example, when the active modular board subassembly is configured to send and receive optical signals, the active modular board subassembly may be optically coupled to an optical cable 150. The optical cable 150 may include an optical fiber cord 158 which consists of a plurality of waveguides, specifically optical fibers (not shown), in a protective sheath. The optical fiber cord 158 may be positioned in a strain relief boot 152 of a waveguide array connector 154 where the individual optical fibers are separated and fixed into position for optical coupling to another waveguide and/or opto-electronic device. The waveguide array connector 154 comprises a plurality of connector pins 156 which extend from the end of the waveguide array connector and are used to align the waveguide array connector with a corresponding connector or device. For example, in the embodiments of the modular active board subassembly 100 described herein, the alignment pin receptacles 122 are operable to receive the connector pins 156 of a waveguide array connector such that when the connector pins 16 are received in the alignment pin receptacles 122, the waveguides 110 of the modular active board subassembly 100 are aligned with and optically coupled to the optical fibers in the waveguide array connector 154.

Once the optical cable 150 is optically coupled to the modular active board subassembly 100, optical signals from the optical cable 150 are guided into the waveguides 110 located in the component cavity 126 which, in turn, direct the optical signals inboard (i.e., in the direction indicated by arrow 163 in FIG. 4) to the transceiver 130 which is electrically coupled to circuit component 180. Accordingly, it should be understood that the modular active board subassembly facilitates propagating an optical signal inboard from the peripheral edge of a primary substrate 160 and, as such, extends the optical link between components closer to the actual circuit component before converting the signal to an electrical signal. Once the optical input signals are received by the transceiver, the transceiver 130 converts the optical input signals to electrical output signals and outputs the electrical output signals through the electrical contacts on the upper surface 129 of the sidewalls 128. Alternatively, when the modular active board subassembly 100 also includes a cover board 140, the electrical output signals may be output through the electrical contacts on the top surface 144 of the cover board 140. In either embodiment the electrical output signals may be distributed to one or more integrated circuit components, such as circuit component 180 which is positioned on and electrically coupled to the electrical contacts 142 on the top surface 144 of the cover board 140.

Similarly, the transceiver 130 is also operable to receive an electrical input signal from the electrical contacts 142 on the top surface 144 of the cover board 140 and convert the electrical input signal into an optical output signal. For example, the circuit component 180 may send an electrical input signal to the transceiver 130 where the electrical input signal is converted to an optical output signal. The transceiver 130 directs the optical output signal into the waveguides 110 where the signal propagates into the waveguide array connector 154 of the optical cable 150 which may be used to distribute the optical output signal to various other components.

FIGS. 1-6 depict the modular active board subassemblies 100 as being generally rectangular in shape such that the modular active board subassemblies 100 (and the corresponding board receiving slots 164) generally extend inboard from the peripheral edge in a substantially linear fashion. However, it should be understood that the modular active board subassemblies 100 may be formed in various other shapes.

Figure 7:
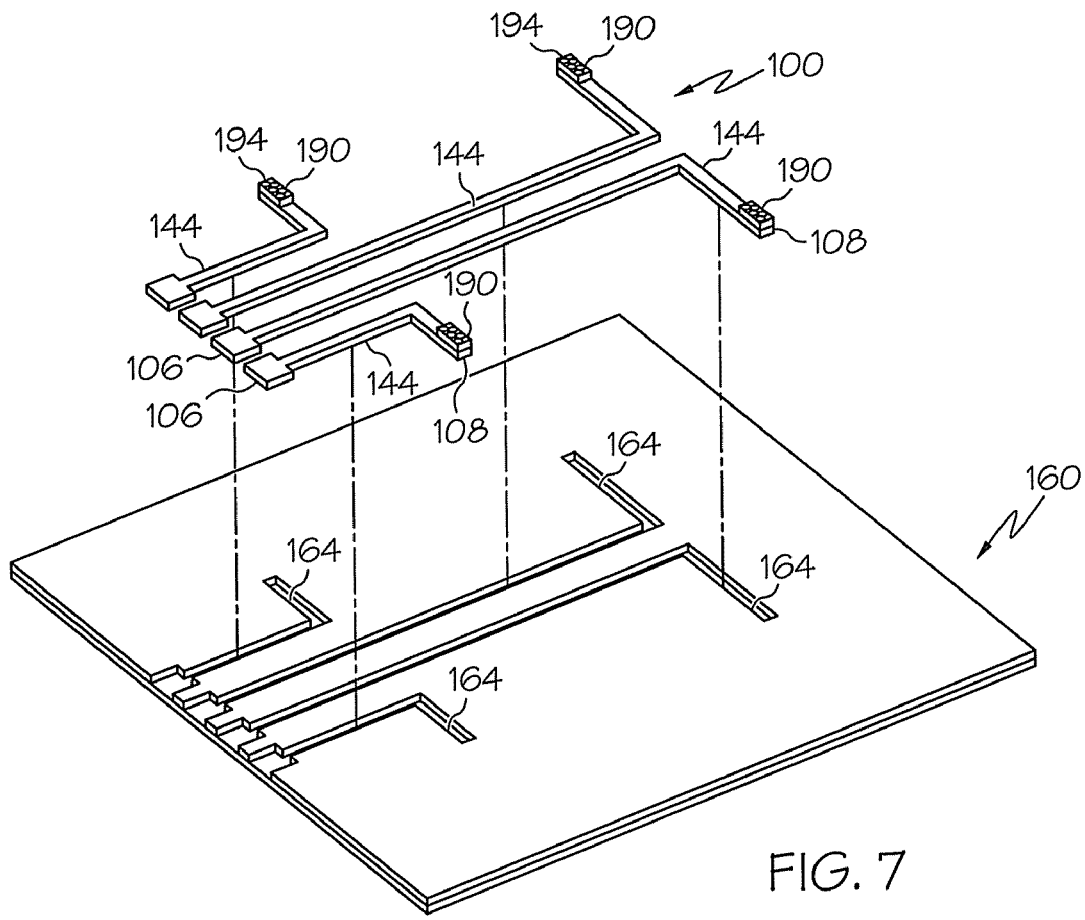
FIG. 7 depicts a plurality of modular active board subassemblies according to one or more embodiments shown and described herein positioned for insertion into a primary substrate to form a printed wiring board assembly according to one or more embodiments shown and described herein.
Figure 8:
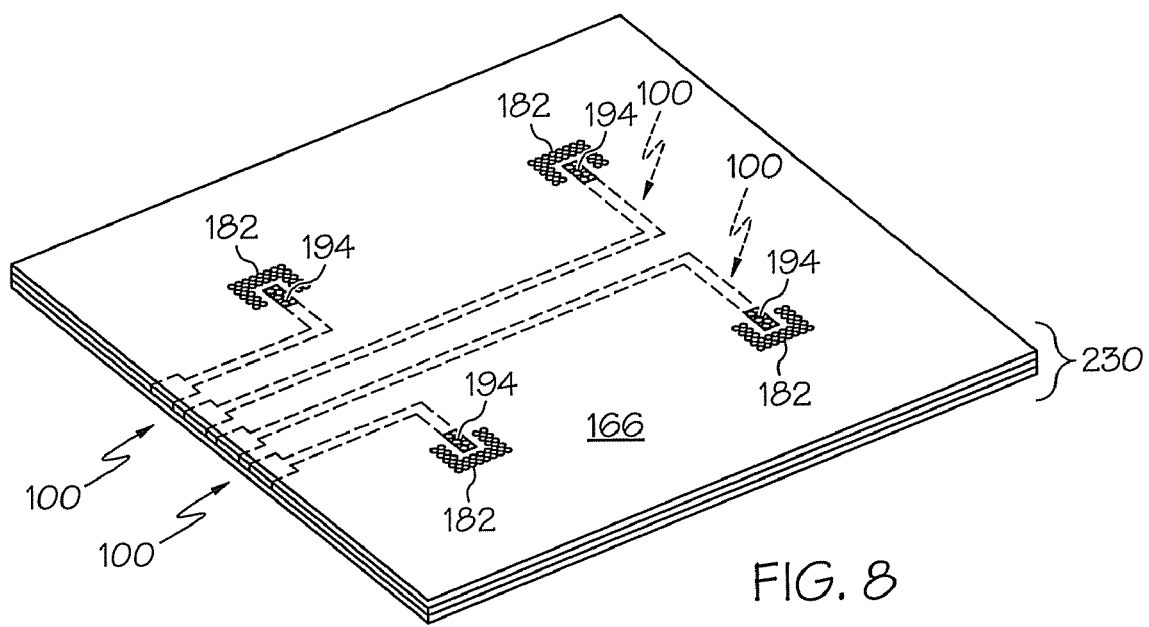
FIG. 8 depicts a printed wiring board assembly formed from the modular active board subassemblies and primary substrate depicted in FIG. 7.

Referring to FIGS. 7 and 8, by way of example, a primary substrate 160 is shown which includes a plurality of board receiving slots 164. The board receiving slots 164 are shaped to receive the modular active board subassemblies 100 disposed over the primary substrate 160 as shown in FIG. 7. In this embodiment the modular active board subassemblies 100 are formed with a 90 degree bend between the outboard edge 106 and the inboard edge 108. This configuration facilitates the use of multiple modular active board subassembly on a primary substrate 160 by locating the inboard edge 108 of each modular active board subassemblies at a different area of the substrate. This configuration distributes the location of each integrated circuit (not shown) which will be electrically coupled to the modular active board subassemblies over the component mounting surface 166 of the primary substrate 160. The modular active board subassemblies 100 may be inserted in the primary substrate 160 in a similar manner as described above to form the printed wiring board assembly 230.

While the modular active board subassemblies 100 are depicted in FIGS. 7 and 8 as having a 90 degree bend between the inboard and outboard edges, it should be understood that the modular active board subassemblies 100 may take on other configurations. For example, the bend between the inboard and outboard edges may be greater than 90 degrees or less than 90 degrees. Alternatively, the modular active board subassembly may include one or more curves between the inboard edge and the outboard edge, such as when the modular active board subassembly is in the form of an arc or an "S" curve.

Further, the embodiment of the printed wiring board assembly 230 shown in FIGS. 7 and 8 is formed in a similar manner as the printed wiring board assembly shown in FIG. 6, i.e., the modular active board subassembly is positioned in the board receiving slot and additional layers of conductive material and/or dielectric material are added to the primary substrate to imbed the modular active board subassembly in the primary substrate 160. However, in the embodiment of the printed wiring board assembly 230 shown in FIGS. 7 and 8, the modular active board subassemblies 100 further comprise an extension element 190 located on the top surface 144 of each modular active board subassembly 100. The extension element 190 may be formed from printed circuit board material and comprises a plurality of vias (not shown) which extend through the extension element 190 and couple the electrical contacts on the top surface of the modular active board subassembly with the electrical contacts 194 positioned on the extension element 190. Thereafter, the additional layers of conductive material and dielectric material positioned over the modular active board subassembly are formed with an opening of suitable dimensions for receiving the extension element. In this embodiment, the extension element 190 is flush with the component mounting surface 166 of the primary substrate 160. Similarly, the electrical contacts 194 of the extension element 190 are flush with the electrical contacts 182 positioned on the component mounting surface of the primary substrate 160.

Further, while the embodiments depicted in FIGS. 7 and 8 show the modular active board subassemblies 100 as having an extension element 190 located on the top surface 144, such as when the modular active board subassemblies 100 are formed with a cover board, it should be understood that in other embodiments the extension element 190 may be positioned on the upper surface of the sidewall, such as when the modular active board subassemblies are formed without a cover board.

It should now be understood that the present specification discloses modular active board subassemblies which may be positioned in a board receiving channel on a primary substrate to form a printed wiring board assembly. The modular active board subassemblies and printed wiring board assemblies incorporating the same present several advantages. For example, the modular active board subassemblies used to form a printed wiring board assemblies facilitate extending the waveguide interconnection of electrical circuit components inboard from the peripheral edge of the substrate while not occupying additional surface area on the component mounting surface of the primary substrate. This allows for the faster exchange of signals between circuit components on different printed wiring board assemblies while freeing up surface area for additional circuit components on a single printed wiring board assembly.

Further, extending the waveguide interconnections inboard of the peripheral edge of the primary substrate eliminates the use of electrical interconnects which, in turn, mitigates RF interference between electrical interconnects and one potential source of errors in data transmission.

Further, use of modular active board subassemblies allows the modular active board subassembly and, more specifically, the waveguide components of the modular active board subassembly to be assembled and aligned independent of the purely electrical components of the primary substrate. As a result, when the modular active board subassembly is assembled into the primary substrate, precise alignment is not necessary as the waveguide components are pre-aligned and only electrical interconnections between the modular active board subassembly and other circuit components and/or the primary substrate are being made. This reduces the overall precision needed for assembly of the primary substrate.

Moreover, use of modular active board subassemblies facilitates testing each subassembly prior to integrating the subassembly into a printed wiring board assembly thereby reducing the number of quality control tests performed on the finished printed wiring board assemblies and decreasing process waste by reducing the amount of non-compliant printed wiring board assemblies resulting from defective modular active board subassemblies.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A modular active board subassembly for communicatively coupling a waveguide array to an electrical component on a printed wiring board, the modular active board subassembly comprising:
   a substrate board having an attachment surface extending between an inboard edge and an outboard edge and a sidewall extending around at least a portion of a perimeter of the attachment surface forming a component cavity on the attachment surface;
   a transceiver disposed in the component cavity proximate the inboard edge of the substrate board, wherein the transceiver is electrically coupled to conductors on the attachment surface and the conductors are electrically coupled to electrical contacts on an upper surface of the sidewall; and
   at least one waveguide positioned in the component cavity and extending from the outboard edge of the substrate board to the transceiver, wherein the at least one waveguide is coupled to the transceiver, modular active board subassembly of further comprising a cover board positioned on the upper surface of the sidewall such that the component cavity is at least partially enclosed, wherein the electrical contacts of the sidewall are electrically coupled to electrical contacts positioned on a top surface of the cover board.

2. The modular active board subassembly of claim 1 further comprising at least one transceiver support component positioned on the top surface of the cover board and electrically coupled to the transceiver.

3. The modular active board subassembly of claim 1 further comprising at least one transceiver support component disposed in the component cavity and electrically coupled to the transceiver.

4. The modular active board subassembly of claim 1 wherein the at least one waveguide is selected from the list consisting of patterned waveguides and fiber waveguides.

5. The modular active board subassembly of claim 1 further comprising an waveguide connector aligned with the outboard edge, wherein the waveguide connector is connectable to a waveguide array connector.

6. The modular active board subassembly of claim 5 wherein the waveguide connector comprises at least one alignment pin receptacle.

7. The modular active board subassembly of claim 1 wherein the sidewall is substantially U-shaped and the component cavity is open on the outboard edge of the substrate board.

8. A printed wiring board assembly comprising a primary substrate and a modular active board subassembly, wherein:
   the modular active board subassembly comprises:
      a substrate board having an attachment surface extending between an inboard edge and an outboard edge;
      a transceiver positioned proximate the inboard edge of the substrate board;
      at least one waveguide positioned on the attachment surface and extending from the outboard edge of the substrate board to the transceiver, wherein the at least one waveguide is coupled to the transceiver; and
      an waveguide connector aligned with the outboard edge; and
   the primary substrate comprises:
      a component mounting surface having a plurality of electrical contacts spaced apart from a peripheral edge; and
      a board receiving slot extending in an inboard direction from the peripheral edge of the primary substrate,
   wherein the modular active board subassembly is positioned in the board receiving slot such that the at least one waveguide and the transceiver are recessed from the component mounting surface, the outboard edge of the modular active board subassembly is aligned with the peripheral edge of the primary substrate, further comprising at least one circuit component positioned on the component mounting surface at least partially over the modular active board subassembly.

9. The printed wiring board assembly of claim 8 wherein the transceiver is electrically coupled to the electrical contacts on the component mounting surface.

10. A printed wiring board assembly comprising a primary substrate and a modular active board subassembly, wherein:
   the modular active board subassembly comprises:
      a substrate board having an attachment surface extending between an inboard edge and an outboard edge;
      a transceiver positioned proximate the inboard edge of the substrate board;
      at least one waveguide positioned on the attachment surface and extending from the outboard edge of the substrate board to the transceiver, wherein the at least one waveguide is coupled to the transceiver; and
      an waveguide connector aligned with the outboard edge; and
   the primary substrate comprises:
      a component mounting surface having a plurality of electrical contacts spaced apart from a peripheral edge; and
      a board receiving slot extending in an inboard direction from the peripheral edge of the primary substrate,
   wherein the modular active board subassembly is positioned in the board receiving slot such that the at least one waveguide and the transceiver are recessed from the component mounting surface, the outboard edge of the modular active board subassembly is aligned with the peripheral edge of the primary substrate wherein the component mounting surface of the primary substrate includes a cutout over the board receiving slot; and
   the modular active board subassembly comprises a cover board positioned over the at least one waveguide and the transceiver such that a top surface of the cover board is positioned in the cutout and is flush with the component mounting surface of the primary substrate wherein the transceiver is electrically coupled to electrical contacts positioned on the surface of the cover board.

11. The printed wiring board assembly of claim 10 further comprising a sidewall extending around at least a portion of a perimeter of the attachment surface and forming a component cavity on the attachment surface, wherein the at least one waveguide and the transceiver are disposed in the component cavity.

12. A printed wiring board assembly comprising a primary substrate and a modular active board subassembly, wherein:
the modular active board subassembly comprises:
a substrate board having an attachment surface extending between an inboard edge and an outboard edge;
a transceiver positioned proximate the inboard edge of the substrate board;
at least one waveguide positioned on the attachment surface and extending from the outboard edge of the substrate board to the transceiver, wherein the at least one waveguide is coupled to the transceiver; and
an waveguide connector aligned with the outboard edge; and
the primary substrate comprises:
a component mounting surface having a plurality of electrical contacts spaced apart from a peripheral edge; and
a board receiving slot extending in an inboard direction from the peripheral edge of the primary substrate,
wherein the modular active board subassembly is positioned in the board receiving slot such that the at least one waveguide and the transceiver are recessed from the component mounting surface, the outboard edge of the modular active board subassembly is aligned with the peripheral edge of the primary substrate wherein the component mounting surface of the primary substrate includes a cutout over the board receiving slot; and
the modular active board subassembly comprises a cover board positioned over the at least one waveguide and the transceiver such that a top surface of the cover board is positioned in the cutout and is flush with the component mounting surface of the primary substrate and wherein the transceiver is electrically coupled to electrical contacts positioned on the top surface of the cover board.

13. The printed wiring board assembly of claim 12 wherein the at least one waveguide is selected from the list consisting of patterned waveguides and fiber waveguides.

14. The printed wiring board assembly of claim 12 wherein the waveguide connector comprises at least one alignment pin receptacle.

15. The printed wiring board assembly of claim 12 wherein the sidewall of the modular active board subassembly is substantially U-shaped and the component cavity is open on the outboard edge of the substrate board.

16. A printed wiring board assembly comprising a primary substrate and a modular active board subassembly, wherein:
the modular active board subassembly comprises:
a substrate board having an attachment surface extending between an inboard edge and an outboard edge;
a transceiver positioned proximate the inboard edge of the substrate board;
at least one waveguide positioned on the attachment surface and extending from the outboard edge of the substrate board to the transceiver, wherein the at least one waveguide is coupled to the transceiver; and
an waveguide connector aligned with the outboard edge; and
the primary substrate comprises:
a component mounting surface having a plurality of electrical contacts spaced apart from a peripheral edge; and
a board receiving slot extending in an inboard direction from the peripheral edge of the primary substrate,
wherein the modular active board subassembly is positioned in the board receiving slot such that the at least one waveguide and the transceiver are recessed from the component mounting surface, the outboard edge of the modular active board subassembly is aligned with the peripheral edge of the primary substrate wherein the component mounting surface of the primary substrate includes a cutout over the board receiving slot; and
the modular active board subassembly comprises a cover board positioned over the at least one waveguide and the transceiver such that a top surface of the cover board is positioned in the cutout and is flush with the component mounting surface of the primary substrate, and further comprising at least one transceiver support component positioned on the top surface of the cover board and electrically coupled to the transceiver.

17. The printed wiring board assembly of claim 16 further comprising at least one transceiver support component disposed on the substrate board of the modular active board subassembly wherein the at least one transceiver support component is electrically coupled to the transceiver.

18. The printed wiring board assembly of claim 16 wherein the component mounting surface of the primary substrate includes a cutout over the board receiving slot; and
the modular active board subassembly is positioned in the board receiving slot such that the substrate board is positioned in the cutout and is flush with the component mounting surface of the primary substrate and the at least one waveguide and the transceiver are located in the board receiving slot.

19. A printed wiring board assembly comprising a primary substrate and a modular active board subassembly, wherein:
the modular active board subassembly comprises:
a substrate board having an attachment surface extending between an inboard edge and an outboard edge;
a transceiver positioned proximate the inboard edge of the substrate board;
at least one waveguide positioned on the attachment surface and extending from the outboard edge of the substrate board to the transceiver, wherein the at least one waveguide is coupled to the transceiver; and
an waveguide connector aligned with the outboard edge; and
the primary substrate comprises:
a component mounting surface having a plurality of electrical contacts spaced apart from a peripheral edge; and
a board receiving slot extending in an inboard direction from the peripheral edge of the primary substrate,
wherein the modular active board subassembly is positioned in the board receiving slot such that the at least one waveguide and the transceiver are recessed from the component mounting surface, the outboard edge of the modular active board subassembly is aligned with the peripheral edge of the primary substrate wherein the component mounting surface of the primary substrate includes a cutout over the board receiving slot; and
the modular active board subassembly comprises a cover board positioned over the at least one waveguide and the transceiver such that a top surface of the cover board is positioned in the cutout and is flush with the component mounting surface of the primary substrate, and further comprising at least one circuit component positioned on the component mounting surface at least partially over the modular active board subassembly.

* * * * *